United States Patent [19]

Ishikawa et al.

[11] Patent Number: 4,622,663
[45] Date of Patent: Nov. 11, 1986

[54] OPTICAL WAVELENGTH DEMULTIPLEXER

[75] Inventors: Haruo Ishikawa, Oume; Yoshimasa Fujii, Tokyo, both of Japan

[73] Assignee: Sumitomo Metal Mining Company Limited, Tokyo, Japan

[21] Appl. No.: 693,110

[22] Filed: Jan. 22, 1985

[30] Foreign Application Priority Data

Jan. 25, 1984 [JP] Japan ................................. 59-12692

[51] Int. Cl.⁴ ............................................. H04B 9/00
[52] U.S. Cl. .................................... 370/3; 350/96.15; 350/96.19
[58] Field of Search ..................... 370/1, 3; 350/96.15, 350/96.16, 96.19

[56] References Cited

U.S. PATENT DOCUMENTS

| | | | |
|---|---|---|---|
| 4,335,933 | 6/1982 | Palmer | 370/1 |
| 4,343,532 | 8/1982 | Palmer | 370/3 |
| 4,493,528 | 1/1985 | Shaw et al. | 350/96.15 |

FOREIGN PATENT DOCUMENTS 54-4153  1/1979  Japan ................................. 350/96.15

Primary Examiner—Joseph A. Orsino, Jr.
Attorney, Agent, or Firm—Watson, Cole, Grindle & Watson

[57] ABSTRACT

An optical wavelength demultiplexer includes a retainer means which curvedly retains an optical fiber. A mirror-polished surface is formed on the convex side of a curved portion of the optical fiber which is retained by the retainer means in such a manner that the mirror-polished surface is in close proximity to the core of the optical fiber. Further, a diffraction grating is disposed such as to oppose and contact the mirror-polished surface. The pitch of the diffraction grating is set to be $\lambda/2n_f$, where $\lambda$ represents the wavelength of light to be separated, and $n_f$ the effective refractive index of the optical fiber. The direction of the pitch is selected to be coincident with the extending direction of the optical fiber.

4 Claims, 15 Drawing Figures

FIG·6
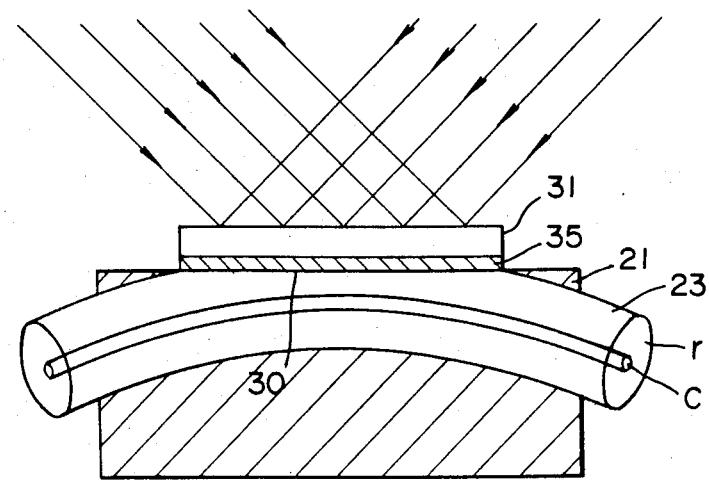
FIG·7
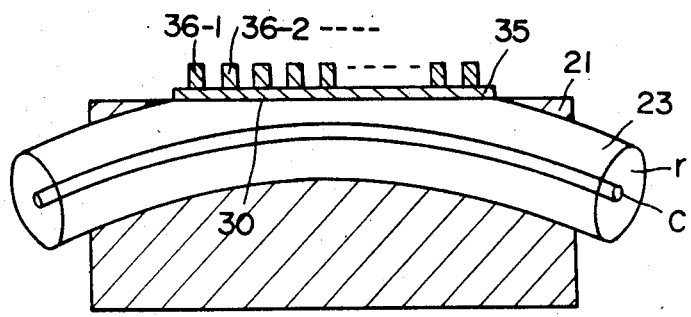

OPTICAL WAVELENGTH DEMULTIPLEXER

BACKGROUND OF THE INVENTION

1. Field of the Invention

The present invention relates to an optical wavelength demultiplexer which separates light that contains a plurality of wavelengths into individual components in accordance with their respective wavelengths.

2. Description of the Prior Art

In order to increase transmission capacity in optical communications it is general practice to use an optical wavelength multiplexing means in which a plurality of optical signals of different wavelengths are propagated over the same optical transmission line. In optical communications employing this type of optical wavelength multiplexing means, it is necessary to provide an optical wavelength demultiplexer on the receiving side of the optical transmission line for the purpose of separating the multiplexed optical signals in accordance with their respective wavelengths.

As optical wavelength demultiplexers employed for the above-described purpose, various types of elements have heretofore been proposed. These optical wavelength demultiplexers generally fall into three types: angular dispersive elements which use diffraction gratings or prisms; wavelength selective transmitting or reflecting elements which use interference filter films; and optical waveguide circuits.

FIG. 1 shows the arrangement of a conventionally proposed optical wavelength demultiplexer of the type which employs interference filter films. In this optical wavelength demultiplexer, signal light consisting of light of a wavelength $\lambda_1$ and light of a wavelength $\lambda_2$ is input from an input fiber 11, and the signal light is separated into the light of the wavelength $\lambda_1$ and the light of the wavelength $\lambda_2$, which are respectively output to output fibers 12 and 13.

Between the input and output fibers 11, 12 are disposed lenses 15-1 and 15-2 which interpose a filter film 14-1 therebetween. The end portion of the input fiber 11 is optically attached to one end side of the incident-light surface of the lens 15-1, so that the light of the wavelength $\lambda_1$ in the signal light refracted by the lens 15-1 passes through the filter film 14-1, whereby the light of the wavelength $\lambda_1$ selected by the filter film 14-1 is refracted at one end side of the emergent-light surface of the lens 15-2 and is taken out by means of the output fiber 12. The light of the wavelength $\lambda_2$ in the signal light is reflected by the end surface of the lens 15-1 and enters a lens 15-3 which is optically brought into contact with the other end side of the incident-light surface of the lens 15-1. The light of the wavelength $\lambda_2$ entering the lens 15-3 passes through a filter film 14-2 which selectively transmits the light of the wavelength $\lambda_2$ and is refracted at one end side of the emergent-light surface of a lens 15-4 and is taken out by means of the output fiber 13.

In the conventionally proposed optical wavelength demultiplexer of the type described above, such as that illustrated in FIG. 1, the wavelength demultiplexer portion is provided independently of the optical fibers and, therefore, the structure as a whole is disadvantageously complicated and increased in size. At the same time, it is inconveniently necessary to accurately effect complicated operations, such as a fine adjustment of optical axes, in the manufacturing process. Even if such adjusting operations have been properly effected, the adjusted operating conditions may be unfavorably changed by external disturbances, such as temperature changes or externally applied vibrations. Accordingly, it is not possible to maintain a stable operation over a long period of time without the need for a readjusting operation.

SUMMARY OF THE INVENTION

It is a primary object of the present invention to overcome the above-described disadvantages of the conventionally proposed optical wavelength demultiplexer and to provide an optical wavelength demultiplexer which can be reduced in its size as a whole, which has a relatively simple structure, and which requires a reduced number of fine adjustments, such as a fine adjustment of optical axes, in the manufacturing process. It is also an object of the invention to provide an optical wavelength demultiplexer which is capable of maintaining stable performance characteristics over a long period of time without the possibility that the performance characteristics may be easily changed by external disturbances, such as temperature changes and externally applied vibrations.

To this end, according to the present invention, there is provided an optical wavelength demultiplexer in which an optical fiber is curvedly retained by a retainer means, and a mirror-polished surface is formed on the convex side of a curved portion of the optical fiber retained by the retainer means in such a manner that the mirror-polished surface is in close proximity to the core of the optical fiber.

According to the present invention, further, a diffraction grating is disposed such as to oppose and contact the mirror-polished surface formed in the manner described above such that the direction of its pitch is selected to be coincident with the extending direction of the optical fiber.

The pitch of the diffraction grating is set such as to be $\lambda/2n_f$, where $\lambda$ represents the wavelength of light to be separated, and $n_f$ the effective refractive index of the optical fiber, that is, the refractive index of the optical fiber as a whole, including its core and cladding portions.

The above and other objects, features and advantages of the present invention will become clear from the following description of the preferred embodiments thereof, taken in conjunction with the accompanying drawings.

BRIEF DESCRIPTION OF THE DRAWINGS

FIGS. 5 to 7 show the embodiment of the optical wavelength demultiplexer according to the present invention in various steps, respectively, in the manufacturing process;

DESCRIPTION OF THE PREFERRED EMBODIMENTS

Figure 1:
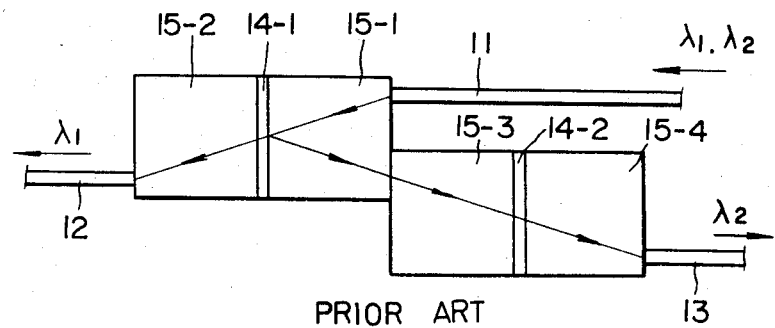
FIG. 1 shows the arrangement of a conventionally proposed optical wavelength demultiplexer.
Figure 2:
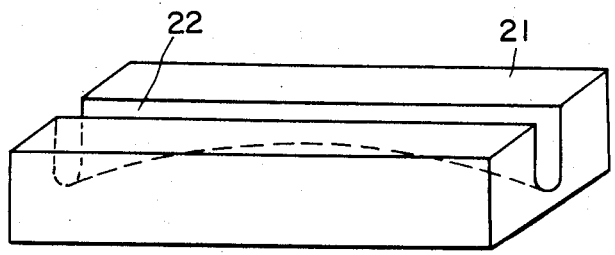
FIGS. 2 and 3 in combination show the arrangement of a substrate employed in one embodiment of the optical wavelength demultiplexer according to the present invention.
Figure 3:
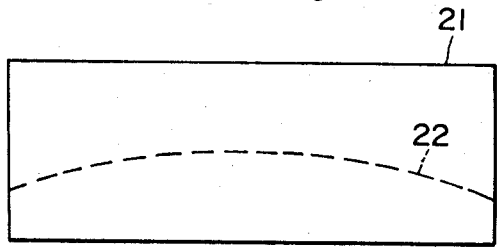
Figure 4:
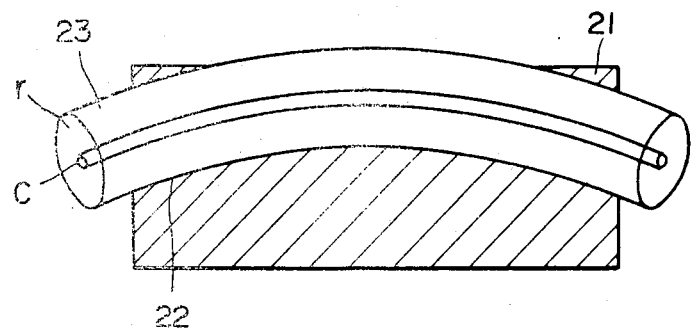
FIG. 4 shows how an optical fiber is fitted, in the substrate in manufacturing the embodiment of the optical wavelength demultiplexer according to the present invention.

The optical wavelength demultiplexer according to the present invention will be described hereinunder in detail through embodiments thereof with reference to the accompanying drawings.

In the present invention, a single-mode optical fiber is employed. For example, the optical fiber employed has a core whose diameter of about 10 $\mu$m. A cladding having an outside diameter of about 125 $\mu$m is disposed on the outside of the core. On the outside of the cladding is disposed a primary coating of a transparent urethane resin having an outside diameter of about 0.5 mm. Further, on the outside of the primary coating is disposed a secondary coating of a white-colored nylon having an outside diameter of about 1 mm.

Such an optical fiber is disposed while being curvedly retained by a retainer means. The retainer means is constituted by a substrate 21 of quartz glass having, for example, a width of 5 mm, a height of 10 mm and a length of 20 mm. The substrate 21 has a groove 22 formed in the central portion thereof in such a manner that the groove 22 extends in the longitudinal direction of the substrate 21 and has a width which allows the groove 22 to receive the optical fiber. The groove 22 has a curvature of about 50 to 100 cm. The groove 22 is formed by notching the substrate 21 by employing a wire saw or a diamond saw with its inner or outer periphery having diamond abrasive grains adhering thereto. In the thus-formed groove 22 is disposed an optical fiber 23 having the coatings removed therefrom in such a manner that the portion of the optical fiber 23 having the coatings removed therefrom extends along the groove 22, and then the optical fiber 23 is secured. To secure the optical fiber 23 in this case a burying method is employed in which a bonding agent, such as an epoxy resin, is employed and filled into the area between the groove 22 and the optical fiber 23.

The convex side of a curved portion of the optical fiber 23 which is curvedly retained by the retainer means is formed with a mirror-polished surface 30 in such a manner that the mirror-polished surface 30 is in close proximity to the core of the optical fiber 23. The mirror-polished surface 30 is formed in such a manner that a fixing jig is attached to a rotary polishing device and polishing is effected at a speed of about 180 rpm under a constant load on the order of 500 g. More specifically, first, the convex side of the curved portion of the optical fiber 23 is lapped by means of alundum until the optical fiber 23 is polished as far as a position very close to the core, for example, a position 10 $\mu$m away from the core. Then, with the same rotary polishing device employed, polishing is effected with cerium oxide ($CeO_2$) powder by the use of a buffing cloth. The lapping speed is set at about 1 $\mu$m per eight seconds, while the polishing speed is set at about 1 $\mu$m per 240 seconds. The polishing is effected until the convex side of the curved portion of the optical fiber 23 becomes flush with the surface of the substrate 21.

In this case, the depth of the central or shallowest portion of the groove 22 is set such as to be slightly smaller than the outside diameter of the portion of the optical fiber 23 having the coatings removed therefrom so that the mirror-polished surface 30 does not reach the core.

A diffraction grating is formed such as to oppose and contact the thus-formed mirror-polished surface 30. The diffraction grating is formed in relation to the optical fiber 23 in either a direct or indirect contact manner. According to the direct contact manner, the diffraction grating is directly formed on the mirror-polished surface; according to the indirect contact manner, a diffraction grating surface is formed on another member, and the member having the diffraction grating surface formed thereon is disposed such that the diffraction grating surface opposes and contacts the mirror-polished surface.

Figure 5:
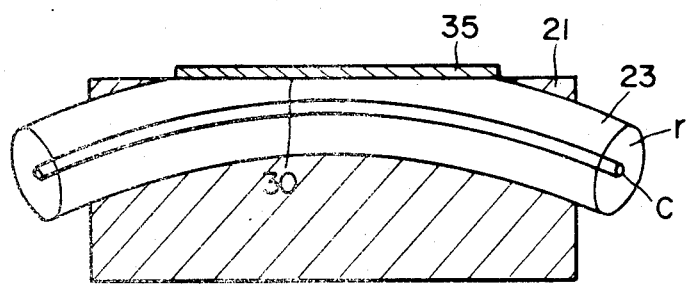

First, the diffraction grating which is formed in the direction contact manner will be described. A relatively low refractive index layer 35 of a material which has a lower refractive index than that of the cladding, for example, $CaF_2$, is formed by means of evaporation on the whole of the mirror-polished surface formed as described above, thereby obtaining an intermediate product having an arrangement such as that shown in FIG. 5. The thickness of the relatively low refractive index layer 35 should be about 0.1 $\mu$m. Then, as shown in FIG. 6, a photoresist film 31 of, for example, AZ-1350, manufactured by SHIPLEY CO., is applied to the surface of the layer 35 in such a manner that the film 31 has a thickness of about 0.2 $\mu$m.

Under this state, laser beams are made incident on the photoresist film 31 from two directions such as to form interference fringes, whereby the photoresist film 31 is subjected to exposure by the interference exposure method. By this exposure, the photoresist film 31 is printed with grating patterns of a period $\Lambda$. The period $\Lambda$ of the printed grating patterns is selected to be $\Lambda = \lambda/2n_f$ where $\lambda$ represents the wavelength of light to be separated, and $n_f$ the effective refractive index of the optical fiber 23. The period $\Lambda$ determines the pitch of the diffraction grating to be formed on the mirror-polished surface, described later.

Thus, the photoresist film 31 is subjected to exposure by the interference exposure method employing the laser beams, and the photoresist film 31 printed with the grating patterns is then developed, whereby photoresist patterns 36-1, 36-2 ... in the shape of a diffraction grating are formed in the manner shown in FIG. 7. More specifically, development of the photoresist film 31 which has been subjected to exposure by the interference exposure method causes the photoresist patterns 36-1, 36-2 ... to be left in the shape of a grating on the relatively low refractive index layer 35 at a period equal to the period $\Lambda$ of the interference fringes. This development treatment is effected such that the layer 35 is exposed.

Then, with the photoresist patterns 36-1, 36-2 ... in the shape of a grating employed as masks, the low refractive index layer 35 is etched by the use of, for example, HF, and, finally, the photoresist masks are removed, whereby diffraction grating patterns 37-1, 37-2

Figure 8:
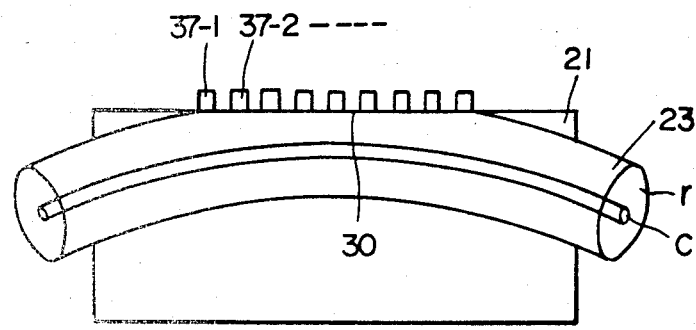
FIG. 8 schematically shows the arrangement of the embodiment of the optical wavelength demultiplexer according to the present invention.

... which are constituted by the low refractive index layer 35 are formed on the mirror-polished surface 30 in the manner shown in FIG. 8. The whole surface is coated with a resin material by means of molding for the purpose of protecting the diffraction grating patterns 37-1, 37-2 ....

It is generally known that, when light is made incident on a diffraction grating having a pitch $\Lambda$, in the incident light, light rays of a wavelength $\lambda = 2n_f\Lambda$ (where $n_f$ represents the effective refractive index of the optical fiber) are reflected as reflected rays. Accordingly, if incident light is applied to the optical fiber having a diffraction grating portion formed in accordance with the embodiment of the present invention, then it is possible to separate light of a predetermined wavelength from the incident light.

Figure 9:
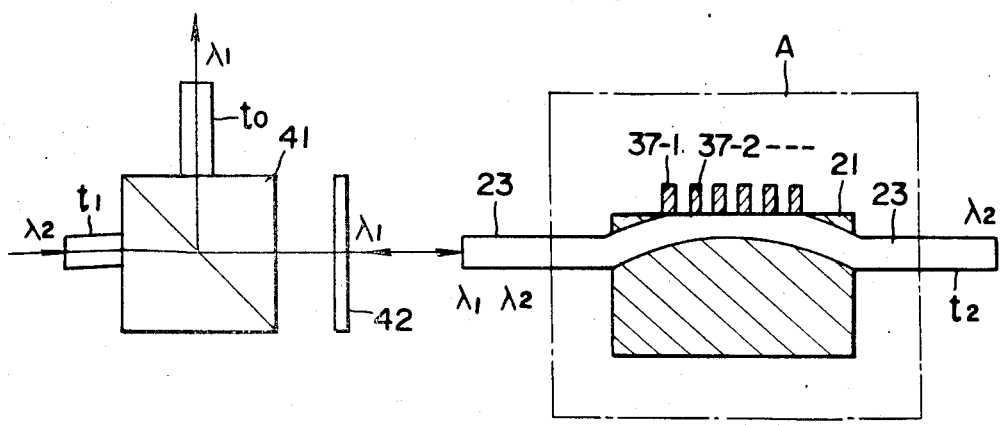
FIG. 9 shows one example of the arrangement of an optical wavelength demultiplexing apparatus employing the optical wavelength demultiplexer according to the present invention.

FIG. 9 shows the arrangement of the whole of an optical wavelength demultiplexing apparatus employing the optical wavelength demultiplexer A according to the present invention. Signal light including components respectively having wavelength $\lambda_1$ and $\lambda_2$ is applied, as an input, to a quarter-wave plate 42 through a polarization beam splitter 41, and the signal light, including the components of the wavelengths $\lambda_1$ and $\lambda_2$, having passed through the quarter-wave plate 42 is applied to the input terminal of the optical fiber 23 of the optical wavelength demultiplexer A. The polarization beam splitter 41 has such characteristics that it transmits input signal light which includes the components of the wavelengths $\lambda_1$ and $\lambda_2$ and which vibrates within one plane but reflects linearly polarized light which vibrates within a plane orthogonal to the plane of vibration of the input signal light.

In the optical wavelength demultiplexer A, as has already been described, light having a wavelength of $2n_f\Lambda$ (where $\Lambda$ represents the pitch of the diffraction grating patterns 37-1, 37-2 ..., and $n_f$ the effective refractive index of the optical fiber 23) is reflected by the diffraction grating patterns 37-1, 37-2 ... and appears as reflected light at the input terminal of the optical wavelength demultiplexer A. Accordingly, if the wavelength $\lambda_1$ in the optical signals is selected to be $\lambda_1 = 2n_f\Lambda$, then light of the wavelength $\lambda_1$ is reflected by the diffraction grating and is made incident on the quarter-wave plate 42 from the input terminal of the optical wavelength demultiplexer A.

The light of the wavelength $\lambda_1$ passes through the quarter-wave plate 42 twice when entering and emerging from the optical wavelength demultiplexer A and, therefore, when entering the polarization beam splitter 41 from the quarter-wave plate 42, the light has already become linearly polarized light which has its plane of polarization 90° rotated. For this reason, the light of the wavelength $\lambda_1$ is reflected by the polarization beam splitter 41 and is taken out from a reflection terminal $t_0$. On the other hand, the light of the wavelength $\lambda_2$ which is not reflected by the diffraction grating patterns 37-1, 37-2 ... is output from an output terminal $t_2$ of the optical wavelength demultiplexer A.

Thus, the signal light including the components respectively having the wavelengths $\lambda_1$ and $\lambda_2$ which is applied to an input terminal $t_1$ is separated into the component of the wavelength $\lambda_1$ which is taken out from the reflection terminal $t_0$ and the component of the wavelength $\lambda_2$ which is taken out from the output terminal $t_2$.

Figure 10A:
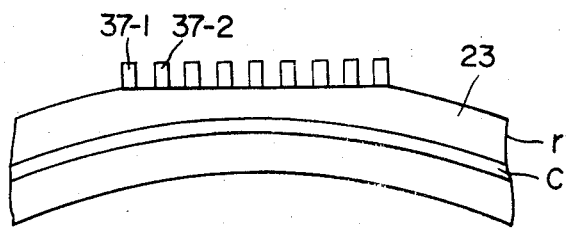
FIGS. 10a to 10d show various characteristics, respectively, of the embodiment of the optical wavelength demultiplexer according to the present invention.
Figure 10B:
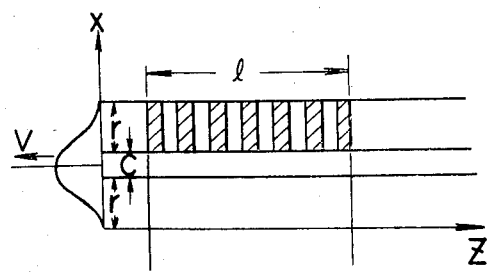

FIGS. 10a to 10b show various characteristics of the optical wavelength demultiplexer according to the present invention. FIG. 10a shows the arrangement of the optical wavelength demultiplexer according to the present invention and, FIG. 10b shows the composition equivalent to the FIG. 10a coupling length is 1. The effective interaction length L shown in FIG. 10b is given by the following equation:

$$L = \frac{1}{K_0} \int_{-\infty}^{\infty} K(Z)dz \quad (1)$$

where K represents the coupling coefficient between the core C and the diffraction grating patterns 37-1, 37-2 ..., and $K_0$ the coupling coefficient at a position where the distance between the core C and the diffraction grating patterns 37-1, 37-2 ... is minimum.

The effective interaction length L is approximated by the following equation:

$$L \approx \sqrt{\frac{\pi R_a}{v}} \quad (2)$$

where R represents the radius of curvature of the optical fiber, a the radius of the core C of the optical fiber, and v the normalized transverse attenuation constant.

Figure 10C:
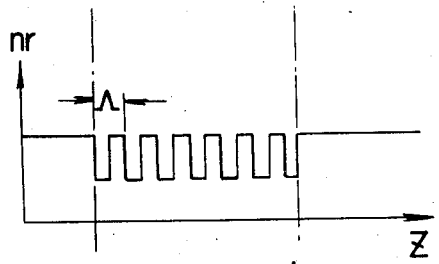

As shown in FIG. 10b, in the optical wavelength demultiplexer of the invention, the amplitude V in the fundamental mode has such characteristics that is concentrates on the core C portion and exponentially attenuates in the cladding r. On the other hand, the effective refractive index $n_f$ of the cladding r portion periodically changes in correspondence with the pitch of the diffraction grating in the manner shown in FIG. 10c.

Figure 10D:
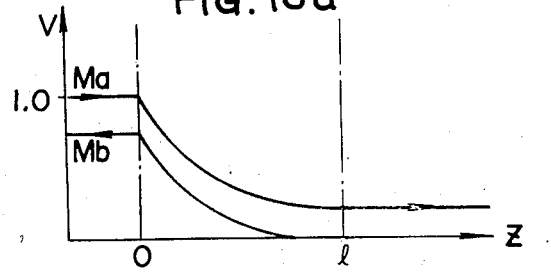

FIG. 10d shows a coupling state between light in a mode $M_a$ and light in a mode $M_b$ which have the same propagation constant and advance in directions opposite to each other in the coupling ($0 < Z < 1$) of the optical wavelength demultiplexer according to the present invention. More specifically, it may be considered that light in the mode $M_a$ made incident on the optical wavelength demultiplexer according to the invention attenuates due to the fact that the energy of the light in the mode $M_a$ gradually shifts to the light in the mode $M_b$ in the coupling region of $0 < Z < 1$, while the light in the mode $M_b$ increases by receiving the energy of the light in the mode $M_a$.

If the effective interaction length L is sufficiently short, the energy exchange rate between the light in the modes $M_a$, $M_b$ increases correspondingly. It may be considered that this exchange of energy is caused by the reflection of the light in the mode $M_a$ by means of the diffraction grating patterns 37-1, 37-2 .... The reflectance in this case is in close proximity to 1 when the effective interaction length L is sufficiently short.

Figure 11:
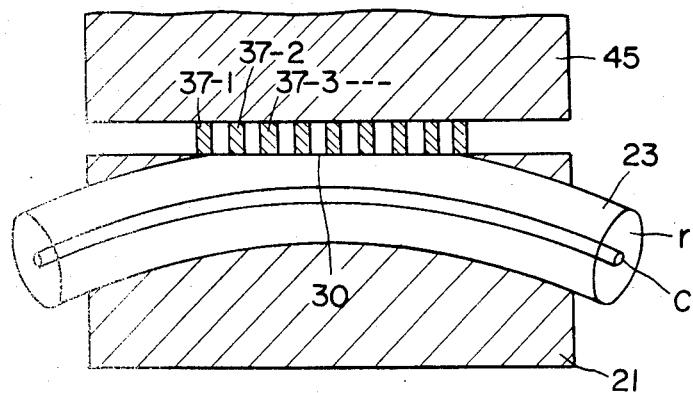
FIG. 11 shows the arrangement of another embodiment of the optical wavelength demultiplexer according to the present invention.

FIG. 11 shows the arrangement of another embodiment of the optical wavelength demultiplexer according to the present invention. This embodiment is arranged in what is called indirect contact manner. More specifically, this indirect contact type optical wavelength demultiplexer has such a structure that the diffraction grating patterns 37-1, 37-2 ... are formed on another substrate 45 by, for example, the above-described method, and the substrate 45 is disposed in such a manner that the surface of the substrate 45 on which the diffraction grating patterns 37-1, 37-2 ... are formed opposes the mirror-polished surface 30 formed on the optical fiber 23 such that the diffraction grating patterns 37-1, 37-2 . . . are in contact with the mirror-polished surface 30.

In the indirect contact type optical wavelength demultiplexer, it is possible to practically change the pitch of the diffraction grating by arranging the element such that the substrate 45 on which the diffraction grating patterns 37-1, 37-2 . . . are formed is pivotal about the center of the mirror-polished surface 30 of the optical fiber 23.

Figure 12:
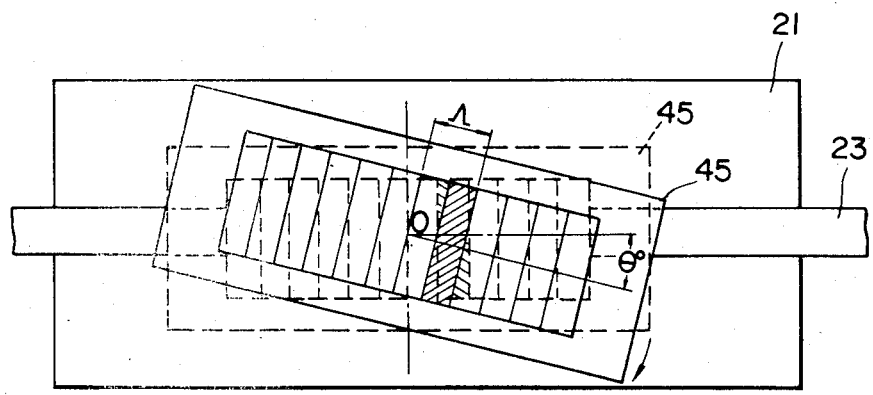
FIG. 12 shows the operating principle of the embodiment shown in FIG. 11.

More specifically, as shown in FIG. 12, if the substrate 45 which is in its initial state wherein the longitudinal axis thereof is coincident with the longitudinal axis of the optical fiber 23 is pivoted by $\theta$ about the center O, then the effective pitch $\Lambda'$ after the pivoting is given by the following equation:

$$\Lambda' = \frac{1}{\cos\theta} \Lambda \qquad (3)$$

Accordingly, such a structure makes it possible to change the wavelength to be separated by pivoting the substrate 45 by a predetermined angle, whereby it is possible to constitute a variable wavelength demultiplexer which is capable of separating a plurality of wavelengths one from another by a single wavelength demultiplexer.

As has been described through the embodiments, according to the present invention, it is not necessary to effect any complicated operation, such as a fine adjustment of optical axes in the manufacturing process and, therefore, the optical wavelength demultiplexer is easily manufactured as compared with conventional optical wavelength demultiplexers. Further, the optical wavelength demultiplexer according to the present invention has a simple and firm structure in which the diffraction grating is disposed such as to oppose and contact the mirror-polished surface 30 formed on the peripheral surface of the optical fiber 23. Accordingly, it is possible to greatly reduce the size of the optical wavelength demultiplexer as a whole.

In addition, the demultiplexer has excellent wavelength separating characteristics. It is also possible to easily realize an optical wavelength demultiplexer in which wavelength separating conditions can be continuously changed by adopting the indirect contact structure. Furthermore, the wavelength separating operation of the demultiplexer to the invention is extremely stable, and there is little possibility that the operating conditions may be changed by external disturbances, such as temperature changes and externally applied vibrations.

It is to be noted that, although quartz glass is employed as the substrate 21 in the above-described embodiments, the substrate 21 may be constituted by a multi-component glass or a synthetic resin material.

As has been described above in detail, according to the present invention, it is possible to provide an optical wavelength demultiplexer which has a simple and firm structure and is reduced in the size as a whole and which has highly accurate wavelength separating characteristics, which are stable against by external disturbances, such as temperature changes and externally applied vibrations, and therefore is capable of realizing a stable and highly accurate wavelength separating operation.

What is claimed is:

1. An optical wavelength demultiplexer which comprises a first substrate which has a top surface and an elongated groove extending therein from said top surface, said elongated groove having a floor which is convexly curved in the elongated dimension of said groove, the shallowest depth of said convexly curved floor in said first substrate being less than a distance r, a single-mode optical fiber having a radius r positioned in said elongated groove in said first substrate, said optical fiber including an inner core and an outer cladding, a portion of said outer cladding which would otherwise extend above said top surface of said first substrate being removed to provide a generally flat, mirror-polished surface, said generally flat, mirror-polished surface being near said inner core of said single-mode optical fiber, said optical fiber being capable of carrying light having differing wavelengths therethrough, and a diffraction grating in direct contact with said generally flat, mirror-polished surface of said outer cladding of said optical fiber so as to separate a portion of the light that is passing through said optical fiber and reflect said light portion back into said optical fiber in the direction from which it came, said light portion comprising of certain wavelengths, said diffraction grating having a pitch of $\lambda/2n_f$, where $\lambda$ is the wavelength light to be separated and $n_f$ the effective refractive index of said optical fiber, said diffraction grating being oriented with respect to said optical fiber that the direction of its pitch is coincident with the elongation direction of said groove.

2. The optical wavelength demultiplexer according to claim 1, wherein the top surface of said first substrate is generally flat and the generally flat, mirror-polished surface of said optical fiber is generally coplanar therewith.

3. The optical wavelength demultiplexer according to claim 1, wherein said diffraction grating comprises a second substrate which is positioned above said top surface of said first substrate and a series of separated diffraction grating patterns connected to said second substrate and in contact with said generally flat, mirror-polished surface of said outer cladding of said optical fiber.

4. The optical wavelength demultiplexer according to claim 3, wherein said second substrate is movably mounted relative to said first substrate such that the pitch of the diffraction grating thereof can be adjustably oriented with respect to the elongation direction of said groove in said first substrate.

* * * * *